US005509954A

United States Patent [19]
Derian et al.

[11] Patent Number: 5,509,954
[45] Date of Patent: Apr. 23, 1996

[54] METHOD AND APPARATUS FOR DEGASSING HIGH VISCOSITY FLUIDS

[75] Inventors: Gary A. Derian, Westlake; Herman E. Turner, Jr., Wellington; Robert D. Schneider, Vermilion, all of Ohio

[73] Assignee: Nordson Corporation, Westlake, Ohio

[21] Appl. No.: 218,727

[22] Filed: Mar. 28, 1994

[51] Int. Cl.[6] ................................................. B01D 19/00
[52] U.S. Cl. ................. 95/24; 95/248; 95/262; 95/266; 96/157; 96/197; 96/200; 96/206
[58] Field of Search ........................... 96/157–159, 194, 96/197, 200, 204, 206, 220, 198; 95/24, 248, 262, 266

[56] References Cited

U.S. PATENT DOCUMENTS

| | | | |
|---|---|---|---|
| 1,592,647 | 7/1926 | Speller | 95/262 X |
| 2,355,057 | 8/1944 | Copeland | 96/167 |
| 2,540,390 | 2/1951 | Gorgerat et al. | 96/197 |
| 3,112,191 | 11/1963 | Anderson | 96/200 |
| 3,676,984 | 7/1972 | Clark | 96/198 |
| 4,002,432 | 1/1977 | Brice et al. | 95/262 X |
| 4,730,634 | 3/1988 | Russell | 95/24 X |
| 5,313,818 | 5/1994 | Sayka et al. | 73/19.1 |

FOREIGN PATENT DOCUMENTS

| | | | |
|---|---|---|---|
| 2594486 | 8/1987 | France . | |
| 893216 | 12/1981 | U.S.S.R. | 96/197 |
| 2067919 | 8/1981 | United Kingdom | 96/197 |

OTHER PUBLICATIONS

*Automation and Robotics for Adhesives and Sealants Use,* Herb Turner, Nordson Corporation, Amherst, Ohio, Reprinted from Engineered Materials Handbook®, vol. 3: Adhesives and Sealants, ASM Internationl, Materials Park, Ohio, 1991.

*Dispensing and Application Equipment for Adhesives and Sealants,* James E. DeVries, Nordson Corporation, Amherst, Ohio, Reprinted from Engineered Materials Handboodk®, vol. 3: Adhesives and Sealants, ASM International, Materials Park, Ohio, 1991.

*Primary Examiner*—Richard L. Chiesa
*Attorney, Agent, or Firm*—Raymond J. Slattery, III; Lee A. Germain

[57] ABSTRACT

A method and apparatus for degassing a high viscosity fluid wherein a vacuum chamber is oriented vertically and adapted for receiving a fluid at its top end and discharging it from a reservoir at its bottom end, the chamber having an assembly having a slotted wide-mouthed nozzle and a channel slide member mounted within the top end so as to receive a fluid fed into the chamber. The nozzle is adapted for spreading the fluid onto the surface of the slide member which is angularly positioned downwardly towards the reservoir such that fluid on the slide member surface exhibits laminar flow as it moves downwardly. A vacuum drawn on the chamber effects a release of any gaseous materials contained within the fluid as it moves down the slide surface and into the reservoir where it may be drawn out for application by one or more nozzles.

28 Claims, 4 Drawing Sheets

METHOD AND APPARATUS FOR DEGASSING HIGH VISCOSITY FLUIDS

FIELD OF THE INVENTION

This invention generally pertains to dispensing systems which use high viscosity materials in their operation such as, for example, high viscosity adhesives, sealants, and/or caulks.

More particularly, this invention pertains to a method and apparatus for degassing high viscosity fluid materials such that these may be dispensed in a continuous and uninterrupted manner to a workpiece.

Specifically, this invention provides a method and a vacuum chamber configuration for degassing high viscosity fluid materials such that, when the material is dispensed from a nozzle onto a workpiece, it is devoid of air bubbles which adversely affect the quality of a product requiring the material as an integral part of its structure.

BACKGROUND OF THE INVENTION

There are many products in the marketplace which utilize the qualities of adhesives, sealants, and/or caulks as an integral part of their structure and, indeed, may depend upon these for structural integrity. These type high viscosity materials may be dispensed from various configurations of nozzles onto a workpiece in a substantially automated operation. It can be appreciated that any introduction of air into the system will adversely affect the quality of the product being produced as the proper quantity of dispensed material may not have been put onto the workpiece. For example, when a product requires the application of an adhesive to effect a bond between parts and thus form an integral unit, should any area be devoid of adhesive this will affect the product structural integrity and thus also its quality. Similarly, a product may require the application of a sealant or caulk to seal out contaminants which may enter the product and a continuous bead of such sealant or caulk is required to maintain seal integrity. In either of the above-described examples any air bubbles within the dispensed material may cause an interruption in the material bead as it is being dispensed from a nozzle. Such interruptions are not acceptable! There is therefore, a need for a method or means to effectively degas high viscosity fluid materials of the type listed above such that these type materials may be dispensed automatically without interruption and in a continuous manner.

It is, therefore, in accordance with one aspect of the present invention an object to provide a method of degassing a high viscosity fluid material.

In accordance with another aspect of the invention it is an object to provide an apparatus which may be applied to a dispensing system, which apparatus effectively degasses a high viscosity fluid material as it is to be dispensed by the system.

According to another aspect of the invention it is an object to provide a degassing vacuum chamber having an inlet assembly mounted within the chamber which enhances degassing of a high viscosity fluid material that is fed into the chamber.

According to still another aspect of the invention it is an object to provide an assembly for a vacuum degassing chamber comprised of a spreader nozzle and an angularly positioned slide member, the assembly effectively enhancing degassing of a high viscosity fluid being fed onto the slide member by the nozzle when subjected to a vacuum condition within the chamber.

SUMMARY OF THE INVENTION

The various objects and other objects and advantages of the invention may be accomplished in a method for degassing a high viscosity fluid comprising the steps of: providing a chamber for collecting a volume of a high viscosity fluid material; mounting a slide member within the chamber at an angular position with respect to a fluid inlet into the chamber; spreading fluid onto the slide member as it enters the chamber; and, allowing the fluid to move down the slide member in laminar flow while subjecting the chamber to a vacuum.

The various objects and advantages of the invention may also be accomplished in an apparatus for degassing a high viscosity fluid material comprising in combination:

a vertically oriented chamber having a fluid inlet at the top end and a collecting reservoir and exit port at the bottom end;

means for drawing and controlling a vacuum within the the chamber;

a slotted wide-mouthed nozzle mounted within the chamber towards its top end to receive fluid entering the chamber;

a longitudinal channel-shaped slide member mounted within the chamber having a top end positioned relative to the nozzle and disposed angularly downwardly towards the chamber reservoir;

the nozzle supplying fluid to the top end of the channel slide member such that the fluid exhibits laminar flow as it moves down the slide and a vacuum drawn on the chamber effects a release of any gaseous materials contained within the fluid as it moves downwardly and into the chamber reservoir. The dispensing of the fluid from the nozzle in a wide pattern also provides a large surface area for exposure to the vacuum of the chamber to help in drawing off entrapped gas.

BRIEF DESCRIPTION OF THE DRAWINGS

The present invention will be best appreciated and understood from a consideration of the following detailed description when taken in conjunction with the accompanying drawings, in the several figures in which like-reference numerals are used to identify like elements and/or members and wherein.

DETAILED DESCRIPTION OF THE PREFERRED EMBODIMENT

Figure 1:
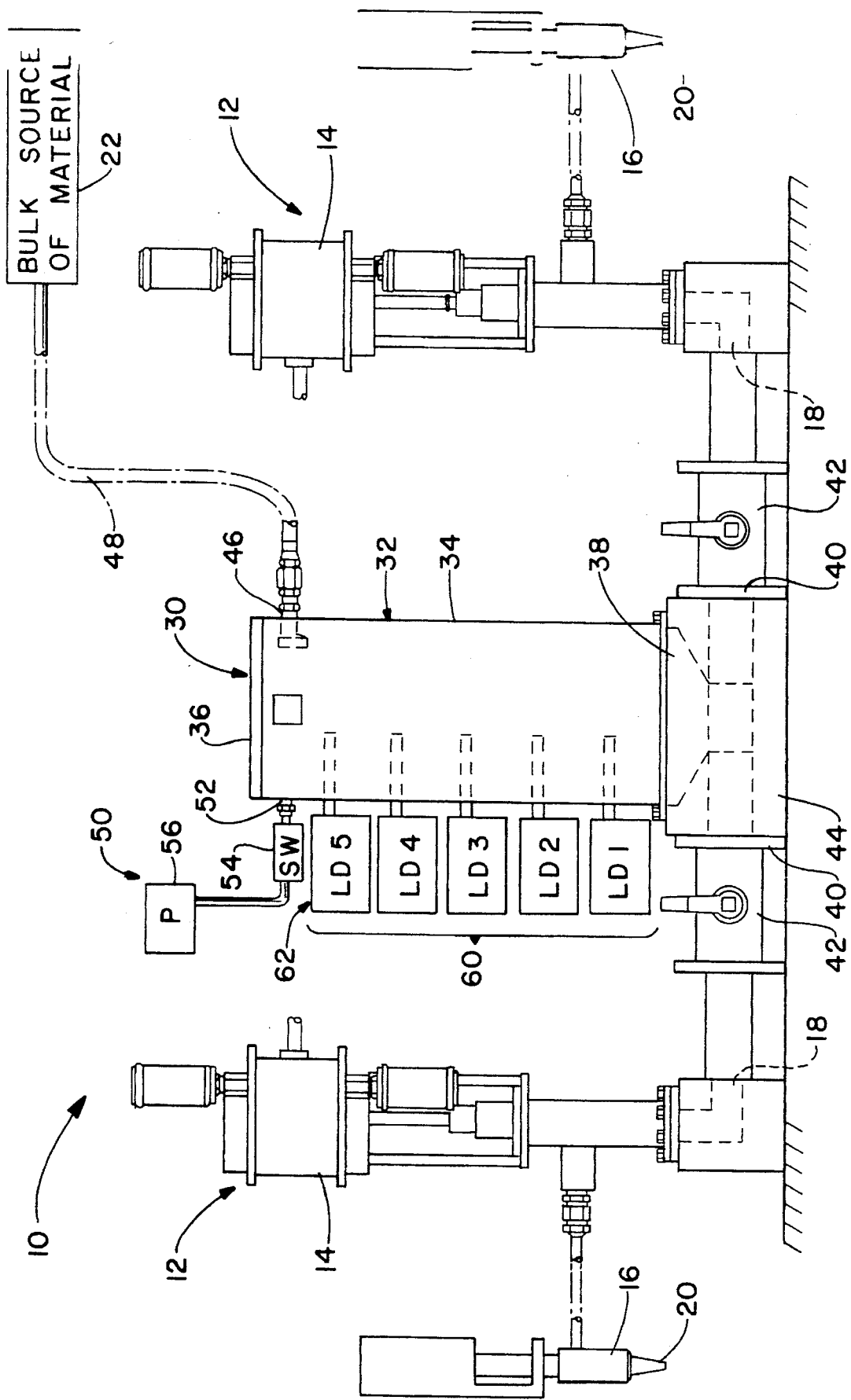
FIG. 1 generally illustrates a fluid dispensing system which is applicable to the method and apparatus of the invention.

Referring firstly to FIG. 1 of the drawings, a material dispensing system is illustrated and generally indicated by reference numeral 10. The system 10 comprises at least one dispensing apparatus 12 (two are shown) which includes a pump 14 and a dispensing nozzle 16, the apparatus 12 being adapted for drawing a fluid material into an entry port 18 and pumping it out of an exit port 20 at the nozzle 16.

Various configurations of dispensing apparatus 12 are known and used in the arts and these may be adapted for operation in an automated system which distributes a high viscosity fluid such as an adhesive or sealant to a workpiece (not shown). The apparatus 12 may draw the high viscosity fluid directly from a source 22 of such type fluid material but this has been found to create problems with air bubbles in the fluid, problems which are not acceptable in many of these type operations.

To solve this problem with air or other gaseous type materials, a degassing apparatus is interposed between the source of high viscosity materials 22 and the dispensing apparatus 12 and it is generally indicated in the drawing at reference numeral 30.

The degassing apparatus 30 generally comprises a chamber 32 having vertically oriented walls 34 enclosed at a top end by a cap closure 36 and at a bottom end by a material receiving reservoir 38. The reservoir 38 may include a water jacket 44 which is fitted about the base of the chamber to maintain a proper temperature within the reservoir 38. The reservoir has an exit fitting 40 which is fitted to a control valve 42 and this in turn is connected to the dispensing apparatus 12 at the inlet port 18 using any of the conventional methods or techniques for effecting such connection.

The degassing apparatus 30 has an inlet fitting or port 46 which is connected to a bulk source of high viscosity fluid material 22 via tubing or like means 48, the fluid being moved or pumped under an appropriate pressure to the apparatus 30. The apparatus 30 also includes a vacuum control generally indicated at reference numeral 50 and it comprises a vacuum port 52, a switch controller 54, and a vacuum pump 56 and these effect and maintain a desired and/or predetermined vacuum within the chamber 32.i The apparatus 30 also includes fluid level control means generally indicated at numeral 60 and these comprise a number of fluid level detectors 62. The level detectors 62 are designated LD1–LD5 and these are connected into the chamber 32 at various levels and their specific operation will be described in more detail hereinafter.

From the foregoing, it will be recognized that if a high viscosity fluid fed into the top end of the chamber 32 is allowed to drop into the reservoir 38, such action will create bubbles in addition to any that may already be present within the fluid prior to its reaching the chamber. A vacuum being drawn on the chamber may cause many of the bubbles to expand and rise to the surface where they burst, but many bubbles which are intermixed within the fluid will not be drawn out by the vacuum but will remain in the fluid as it is drawn out of the reservoir by the dispensing apparatus 12. These bubbles in the fluid are not acceptable in a dispensing operation if they are allowed to reach the dispensing nozzle 16.

Figure 2:
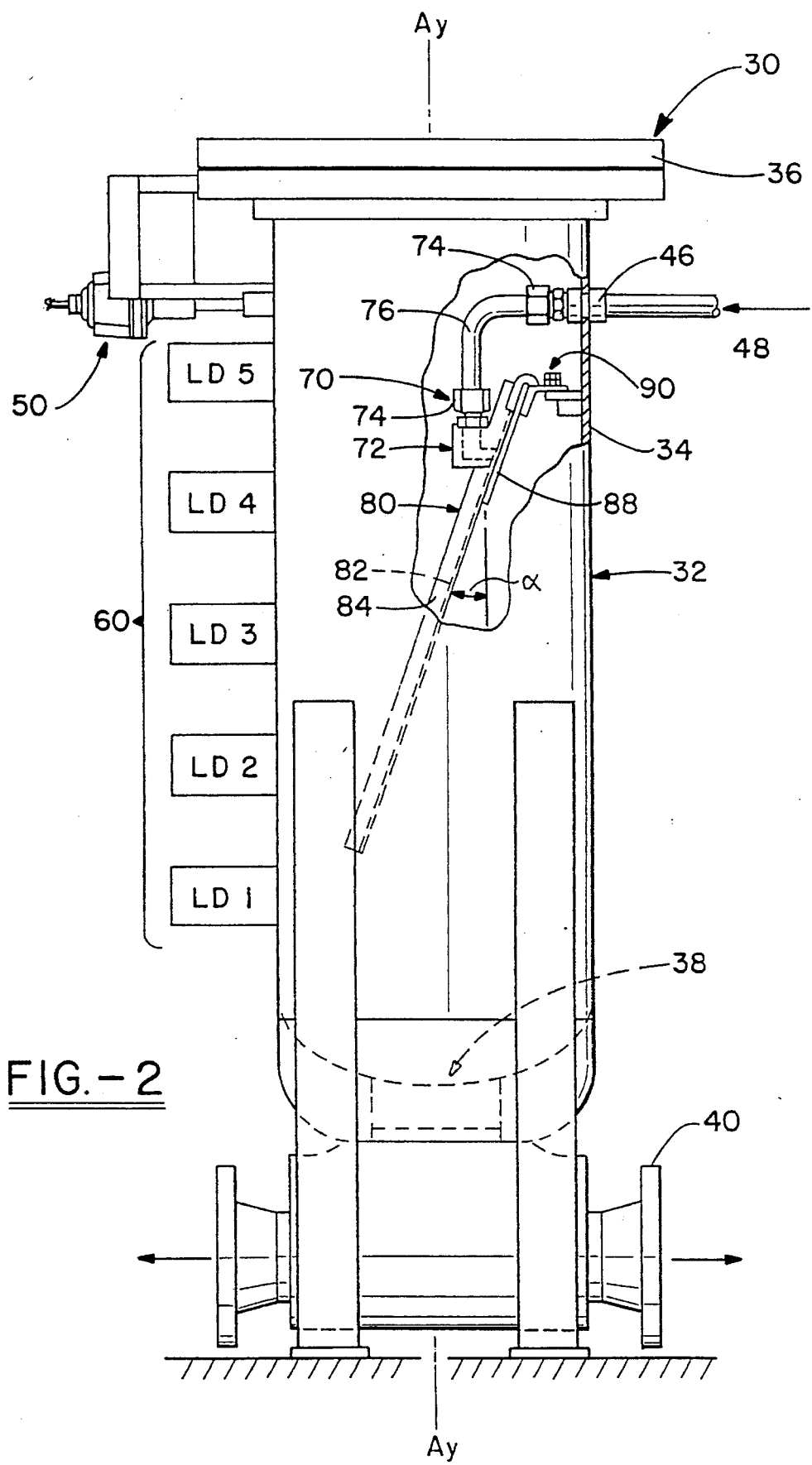
FIG. 2 is an elevational view, partially broken away, of a degassing chamber forming a primary apparatus of the invention.

Referring now also to FIG. 2 of the drawings, a degassing chamber 32 according to this invention is illustrated and it includes a fluid receiving assembly generally indicated at reference numeral 70. The assembly 70 comprises a wide-mouthed or slotted nozzle 72 that is adapted for connection to the fluid inlet 46 via fittings 74 and an interconnecting pipe or tube 76. The tube 76 is bent downwardly from the inlet 46 at an angle of 90° with reference to a longitudinal Ay chamber axis. The nozzle 72 accepts a fluid material and feeds it onto a slide member 80 which is mounted or otherwise affixed to the interior of the chamber wall 34.

The slide member 80 is a substantially shallow U-shaped member defined by a bottom wall or slide surface 82 and side walls 84 which extend the length of the bottom 82. The slide member 80 is mounted in a manner and relationship to the slotted nozzle 72 such that a fluid material is spread out onto the slide surface 82 at the top end of the slide member 80. The slide member 80 is angularaly disposed within the chamber 32 at an angle α with reference to the chamber Ay axis such that fluid materials fed onto the slide surface 82 move downwardly towards the chamber reservoir 38.

Figure 3:
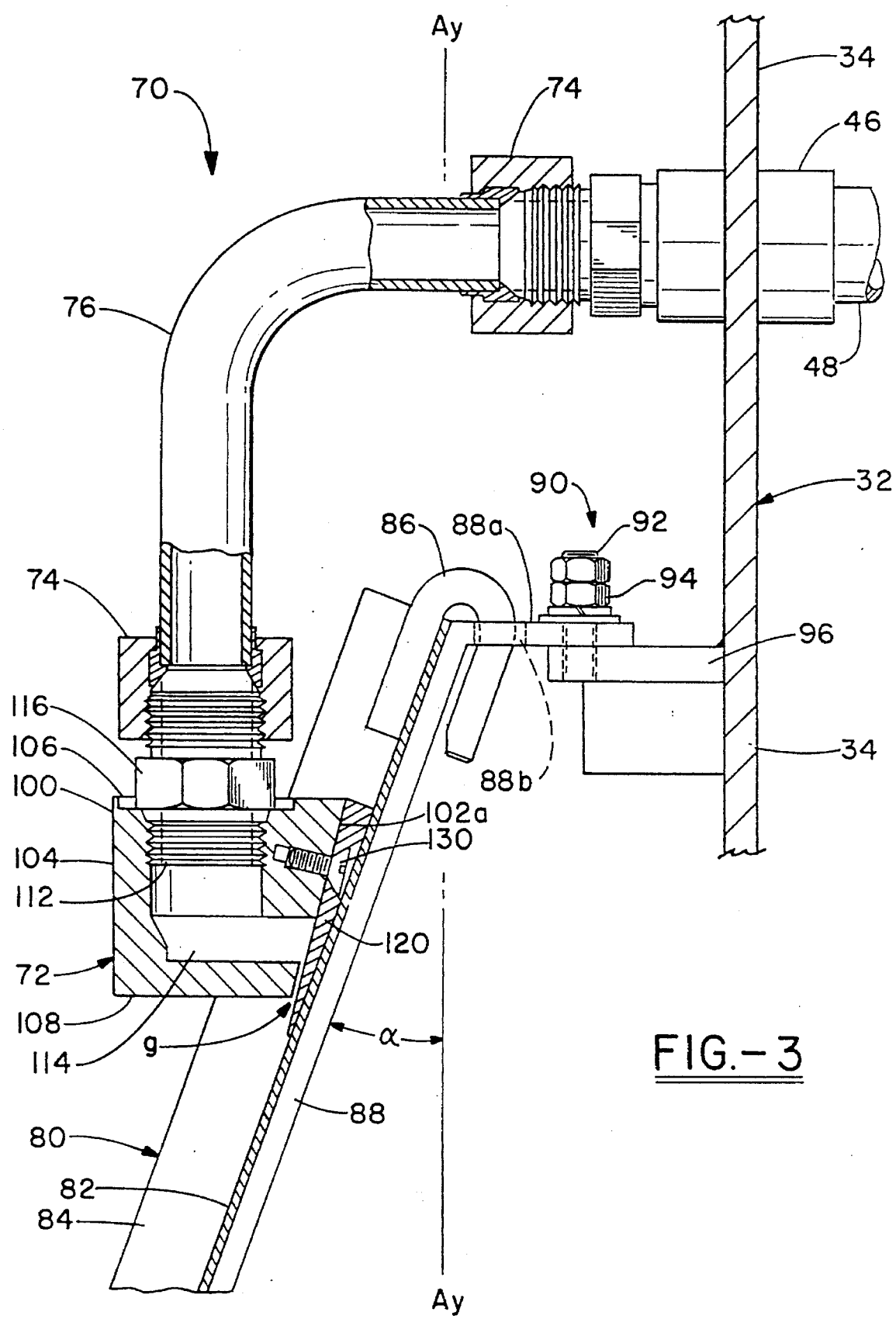
FIG. 3 is an enlarged side elevational view, in cross-section, of an assembly mountable within the degassing chamber illustrated in FIG. 2.
Figure 4:
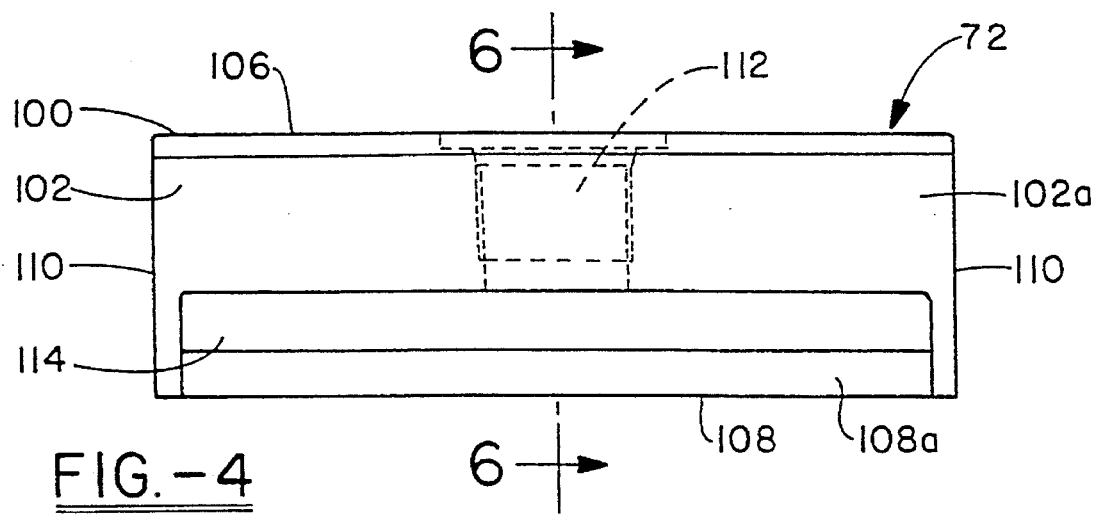
FIG. 4 is a frontal elevational view of a fluid spreading nozzle which forms a part of the assembly shown in FIG. 3.
Figure 5:
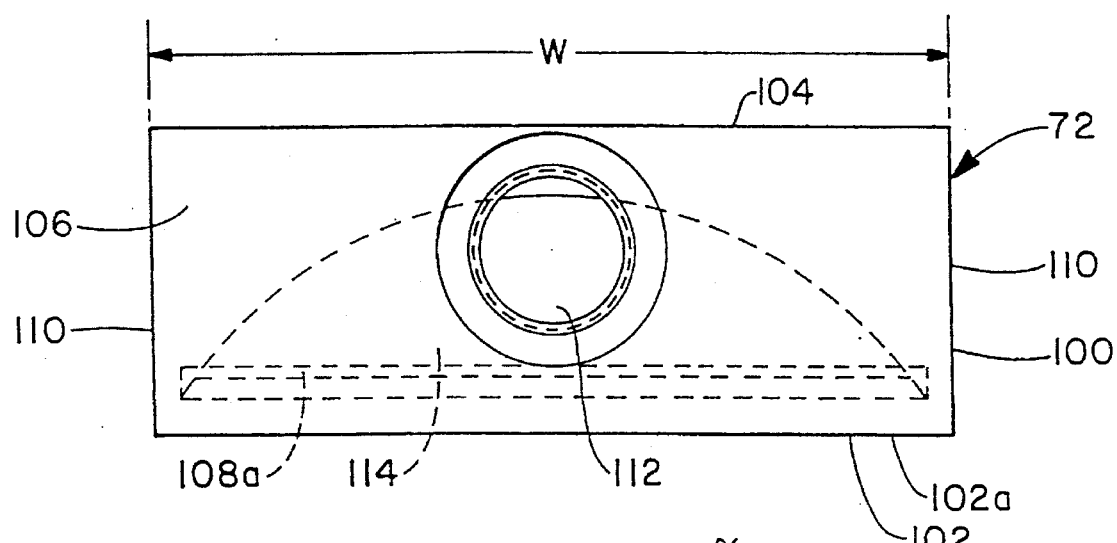
FIG. 5 is a top view of the nozzle shown in FIG. 4.

Referring now to FIGS. 3 through 6 of the drawings, the specifics of the assembly 70 are illustrated in the several views. The slot nozzle 72 comprises a rectangularly shaped body 100 exhibiting a width "W" that is greater than any of its other dimensions. The body 100 is defined by a frontal wall 102 having a face surface 102a that is angularly disposed with respect to a rear wall 104, and this, at an angle $α_1$ with reference to the Ay axis. The body 100 is further defined by a top wall 106 that is parallel to a bottom wall 108 and these-are interconnected by end walls 110. The nozzle 72 is characterized by a bore or input port 112 in the top wall 106 and it is intercepted by a substantially semicircular slot bore or exit port 114 which penetrates rearwardly from the frontal face surface 102a. The input port 112 may be a smooth bore or it may be threaded so as to adapt to a double-ended threaded nipple fitting 116 Which connects to the fluid supply tube 76 via a connector 74 as shown in FIG. 3.

Figures 6, 7:
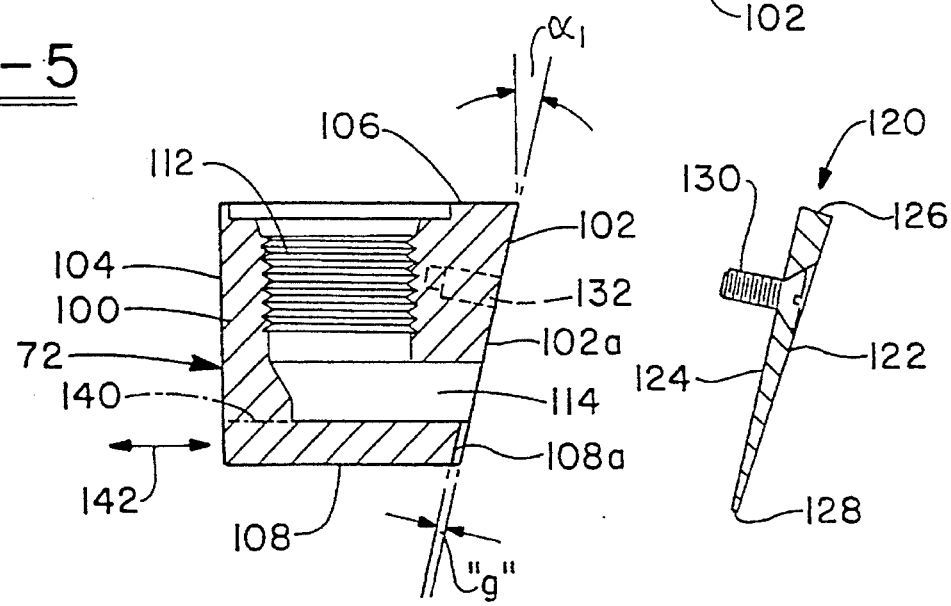
FIG. 6 is a side elevational view, in cross-section, of the nozzle as taken on line 6—6 of FIG. 4.
FIG. 7 is a side elevational view, in cross-section, of a doctor blade as may be applied to the nozzle of the invention.

The bottom wall 108 defines the limit extent of the s lot bore 114 and it exhibits a shorter front-to-rear dimension by a specific amount such as to establish a gap dimension "g" as illustrated in FIGS. 3 and 6 of the drawings. The gap dimension is thus defined by the difference dimension of the frontal face surface 108a of the bottom wall 108 and the frontal face surface 102a of the front wall 102. Further, the gap "g" extends across the full width of the slot bore or exit port 114 of the nozzle 72.

As mentioned above, the slide member 80 comprises a slide surface 82 and side walls 84 and these define a channel which carries a fluid material from the slot nozzle 72 to the chamber reservoir 38. The slide member 80 is mounted within the chamber 32 by way of a support member 88 having a top end formed to a flange 88a. The flange 88a is bent at an angle α+90° with reference to the chamber Ay axis as illustrated in FIG. 3 and it is carried by mounting means generally indicated at reference numeral 90 in the drawing. The mounting means 90 may comprise a bolt or weld stud 92 affixed to a bracket 96 and locknuts 94. Preferably, the bracket 96 will be welded or otherwise secured to the chamber wall 34 while the support member 88 is secured to the bracket via a plurality of bolts 92 as shown. The slide member 80 is mounted to the support member 88 by way of U-shaped hooks 86 that are affixed to the slide member 80 at its top end and these are hung onto the support member flange 88a via suitably configured apertures 88b in the flange. In this manner the slide member 80 may be easily removed for servicing and/or replaced.

It can be appreciated from a consideration of FIGS. 3 and 6 of the drawings that the angular position of the frontal face surface 102a of the wall 102 may be such that the angle α of the slide member 80 is equal to the angle $\alpha_1$ of the face surface 102a. In other Words, the slide member is hung onto a support member 88 that exhibits an angle $\alpha$ that is the same as the angle of the nozzle frontal face surface 102a. Accordingly, the frontal face surface 102a may be positioned to abut the slide surface 82. This mounting, however, is not advantageous inasmuch as it may result in fluid materials being drawn upwardly between the frontal face surface 102a and the slide surface 82. This may happen because of discontinuities which may exit, between the two surfaces and the vacuum drawn on the chamber will draw fluid material between the two surfaces. In this respect, it is important that the high viscosity fluid exiting the nozzle slotted bore 114 flows directly onto the slide surface 82 to the extent that laminar flow exists. Any free fall of the fluid may result in a build-up of irregular mounds which can trap air in pockets formed in the fluid material as it moves downwardly.

The above-recited problem with respect to a registration of the slot nozzle 72 with the slide surface 82 may be eliminated by the provision of a doctor blade member 120 as shown in FIGS. 3 and 7 of the drawings. A doctor blade member 120 may be mounted to the frontal face surface 102a by using appropriate screws 130 threaded into bores 132 in the frontal wall 102 of the nozzle. The doctor blade 120 may be any of numerous cross-sectional shape but, preferably it will be shaped to establish an exit gap "g" suitable for passing a particular viscosity fluid as well as to function to mate with the slide surface 82.

A suitable doctor blade 120 may be defined by a frontal face 122 that is angularly disposed with respect to a rear face 124 to establish an end 126 that is greater in dimension than an opposite end 128. This cross-sectional configuration is that of a wedge wherein the rear face 124 may be abutted to the frontal face surface 102a of the nozzle front wall 102 while the front face 122 is abutted to the slide surface 82 of the slide member 80. In addition, the doctor blade 120 is preferably greater in dimension between the ends 126–128 than is the height dimension of the nozzle between the top 106 and the bottom 108 as clearly evident in FIG. 3 such that it will extend beyond the bottom wall 108 by a certain amount. In this configuration, exact registration between the doctor blade 120 and the slide surface 82 is not a requirement inasmuch as any fluid material passing through the nozzle exit bore 114 will be directed downwardly towards the slide surface in an even distribution of fluid on the surface. From the showing of FIG. 3, it can be seen that the nozzle exit gap "g" is not established by the bottom wall face surface 108a and the slide surface 82 but by the face Surface 108a and the rear surface 124 of the doctor blade 120.

It may be recognized by those knowledgeable in the art that the exit gap "g" may not be adequate for passing all of the ranges of viscosities of fluid materials that one may wish to degas in the chamber 30. For example, while a lower range viscosity fluid may pass through a particular gap "g", a higher range viscosity fluid may be all but blocked from exiting the nozzle 72. In this circumstance, it is anticipated that the gap "g" may be varied to accomodate passage of various viscosity fluid materials and this may be accomplished as illustrated in FIG. 6 of the drawings. For example, a bottom wall 108 of the nozzle body 100 may comprise a separate wall member which is secured to the body using any conventional fastening means. The wall member 108 may be adjustable along an interface line indicated in ghost dot-dashed lines at reference numeral 140 and it may be configured with slots so as to be movable in the direction of reference arrow 142. This will, of course, effect a change in the gap "g" dimension so as to accomodate various viscosity fluid materials. Other means may be used to accomplish varying of the gap "g" and the invention, therefore, is not considered limited to the particular manner described above and/or illustrated in the drawing.

It will also be recognized by those knowledgeable in the art that the slide surface angle $\alpha$ may be adjustable for the various fluid viscosities to be degassed in the chamber 32. For example, the angle $\alpha$ may be within the range of 20°–25° for lower viscosity materials but these angles will be too steep so as to cause higher viscosity fluids to drop off of the slide surface 82. This action, of course, will result in defeating the purposes of the invention as free falling droplets tend to generate air bubbles in the fluid volume that is being collected in the chamber reservoir 38. Thus, the angle $\alpha$ of the slide surface 82 may be increased or decreased depending upon the viscosity of the fluid material being passed through the nozzle 72. As clearly evident from a consideration of FIG. 3, the angle $\alpha$ may be changed by merely changing the support member 88 to another one having a mounting flange 88 exhibiting a greater or lesser angle $\alpha$ as required. In all cases the slide surface angle $\alpha$ must be established such that a fluid material will flow smoothly on the slide surface i.e., laminar flow is established.

For the types of high viscosity fluids envisioned to be passed through the degassing chamber 30, the angle $\alpha$ will preferably be within the range of 20°–30° with reference to a vertical Ay axis of the chamber. While fluid materials exhibiting a viscosity of at least 80,000 centipoise have been used in conjunction with this range of angles, it is believed that this range may also be suitable for materials having a viscosity less than 80,000 centipoise. Also, low levels of vacuum drawn on the chamber 32 in the range of ⅓ to ½ atmosphere may be used to remove large air pockets and/or bubbles within a fluid of a particular viscosity. Higher levels of vacuum, i.e., less than 10% atmosphere, may be applied to de-gassing fluids having dissolved air and such vacuum may also be applied to removing volatile components from some types of fluid materials.

Referring again to FIG. 2 of the drawings, it can be seen that the degassing apparatus 30 also includes a number of level detectors LD1 through LD5. These provide an important function in a continuous degassing operation such that the system does not get shut down because of a lack of or an over abundance of fluid volume within the chamber. For example, the level detector LD1 is an emergency shut off device which shuts down the system should the fluid level get too low. Because one does not want such shut down to happen as this will increase the possibility of air entering the system, a warning level detector LD2 is provided which gives a visual and/or sound warning to an operator of an impending low level condition within the chamber 32. In addition, a high level detector LD5 is provided which automatically shuts down the operation should the volume level exceed a safe upper level condition.

Two additional level detectors LD3 and LD4 are also shown in the drawing and these are used to move the fluid volume level up and down between the two levels. For example, when the fluid volume level drops to LD3, a signal is provided which effects an increase in the volume being fed into the inlet 46. As the volume increases to level LD4, a signal is provided which effects a reduction in the volume being fed into the inlet 46, allowing the fluid volume level to begin dropping again. This action of raising and lowering of the reservoir volume level forces any air bubbles which may exist on the fluid surface in the reservoir against the chamber walls where they are burst. It is, of course, anticipated that one may effect a change in the reservoir level by either increasing or decreasing the amount being drawn out of the reservoir by the dispensing apparatus 12. The invention, therefore, is not considered limited by the particular action taken to accomplish this.

In the operation of the degassing apparatus 30, it can be appreciated that various adjustments may be made to optimize removal of any gaseous bubbles contained within a particular high viscosity fluid material. As described above, the gap "g" at the nozzle 72 may be adjusted as well as the angle $\alpha$ of of the slide surface 82 and because a differential pressure exists at the gap, air bubble dispersion may be optimized at this point in the sysem. In addition, the vacuum condition may be adjusted to increase bubble dispersion and the volume level in the reservoir may be moved up and down so as to burst any bubbles on the surface of the fluid in the reservoir. Thus it can be appreciated that a very effective method and apparatus for degassing high viscosity fluid materials are provided by the present invention and offer advantages in the particular art to which it pertains and, while certain representative embodiments and details have been shown for the purpose of illustrating the invention, it will be apparent to those skilled in this art that various changes and/or modifications may be made without departing from the spirit or scope of the invention.

What is claimed is:

1. An assembly applicable to a vacuum chamber for degassing a high viscosity fluid comprises in combination:

a nozzle having means for connection to a fluid inlet of the chamber comprises a body having a width of substantially greater dimension than either of a front-to-rear and a top-to-bottom dimension and having a top entry port for receiving said fluid and which is intercepted by an orthogonally oriented exit port in a configuration of a wide slot which expands outwardly towards a frontal face of the body, said frontal face being angularly positioned with respect to a rear face and which defines a gap as between a top portion and a bottom portion of the frontal face; and a slide member affixed to an inside surface of the chamber and angularly positioned with reference to a longitudinal vertical axis of the chamber and in relative position to the exit port of the nozzle, said slide member comprised of a slide surface and longitudinal side walls defining a channel from a top end at the nozzle to a bottom end within the chamber;

said nozzle passing a fluid out of its slot configured exit port such that the fluid exhibits laminar flow on the slide member and a vacuum being drawn on the chamber effects a release of any gaseous materials contained in the fluid as it moves down the slide member.

2. The assembly as claimed in claim 1 further comprising a doctor blade member affixed to the frontal face of the nozzle such as to direct a fluid downwardly out of the nozzle exit bore and onto the slide member.

3. The assembly as claimed in claim 2 wherein the doctor blade establishes an exit gap difference as between a top portion of the nozzle frontal face and a bottom portion thereof.

4. The assembly as claimed in claim 3 wherein the doctor blade extends downwardly past the bottom of the nozzle and it abuts the slide surface of slide member.

5. The assembly as claimed in claim 1 wherein the angle of the slide member with reference to a longitudinal vertical axis of the chamber is selected in accordance with the viscosity of the fluid being passed through the chamber.

6. The assembly as claimed in claim 5 wherein the angle varies within the range of 20°–30° for fluids exhibiting viscosities of at least 80,000 centipoise.

7. The assembly as claimed in claim 1 wherein the gap difference is variable.

8. The assembly as claimed in claim 7 wherein the gap is varied by a movable bottom wall of the nozzle which also establishes the bottom extent of the exit bore.

9. The assembly as claimed in claim 1 wherein the slide member is carried by a support member having a flange bent to engage mounting means affixed to the inside of the chamber.

10. The assembly as claimed in claim 9 wherein the angular position of the slide member is established by the support member.

11. An apparatus for degassing a high viscosity fluid comprises in combination:

a vertically oriented chamber having side walls enclosed at a top end by a top closure seal and at a bottom end by a reservoir having an exit port out of the chamber, said chamber having an inlet having means for connection to a supply of fluid materials;

means in operative relationship with the chamber for drawing and controlling a vacuum within the chamber;

an assembly mounted within the chamber comprising:

(a) a nozzle having means for connection to the chamber inlet via a top entry port, said port is intercepted by an orthogonally oriented exit port having a slot configuration which expands outwardly towards a frontal face of the nozzle, said frontal face being angularly positioned with respect to a rear face and which defines a gap as between a top portion of the frontal face and a bottom portion thereof; and (b) a slide member affixed to the inside of the chamber and angularly positioned with reference to a longitudinal vertical axis of the chamber and in relative position to the exit port of the nozzle, said slide member comprised of a bottom slide surface and a pair of longitudinally extending side walls defining a channel from a top end at the nozzle to a bottom end at the reservoir of the chamber;

said nozzle of the assembly having means for passing a high viscosity fluid material out of the slot configured exit port and onto the slide member surface such that the fluid exhibits laminar flow down the slide surface and, a vacuum drawn on the chamber effects a release of any gaseous bubbles which may be contained within the fluid.

12. The apparatus as claimed in claim 11 wherein a doctor blade member is affixed to the frontal face of the nozzle to direct fluid downwardly out of the exit port of the nozzle and onto the slide surface of the slide member.

13. The apparatus as claimed in claim 11 wherein the assembly further comprises a support member affixed to the inside of the chamber by a flange portion and a depending portion extends angularly and downwardly into the chamber to support the slide member which has its top end secured to the support member flange.

14. The apparatus as claimed in claim 13 wherein the support member establishes the angular position of the slide member within the chamber.

15. The apparatus as claimed in claim 14 wherein the angular position of the support member is established by the viscosity of the fluid being fed into the chamber.

16. The apparatus as claimed in claim 15 wherein the angular position varies within the range of 20°–30°.

17. The apparatus as claimed in claim 11 wherein the gap is variable in accordance with the fluid viscosity.

18. The apparatus as claimed in claim 17 wherein the gap is varied by a movable bottom wall of the nozzle, said wall also establishes the bottom extent of the nozzle slotted exit port.

19. The apparatus as claimed in claim 11 further comprising a plurality of fluid level detectors for monitoring the level condition of the fluid within the chamber wherein low and high level detectors are provided which shut down the operation of the chamber should the fluid level meet the low or high level detectors respectively and a pair of mid-level fluid detectors are provided which effect a movement of the fluid level in the upwardly and downwardly directions by providing a first signal which effects an increase in the amount of fluid being fed into the chamber and providing a second signal which effects a decrease in the amount of fluid being fed into the chamber, the increase or decrease of fluid being dependent upon the level condition with reference to the two mid-level detectors.

20. A method of degassing a high viscosity fluid comprises the steps of:

providing a vacuum chamber having a longitudinal vertical axis, a fluid inlet port at its top end and, a fluid collecting reservoir and exit port at its bottom end;

mounting a wide-slotted nozzle within the chamber in a position at the top end to accept fluid and move it out of its exit port;

positioning a channel-shaped longitudinal slide comprising a bottom slide surface and a pair of longitudinally extending side walls within the chamber in an angular orientation with reference to the chamber vertical axis and in relative position at its top end to the nozzle exit port and at its bottom end to the fluid collecting reservoir for producing laminar fluid flow; and applying a vacuum to the chamber as fluid is fed into the chamber such that any gaseous bubbles contained within the fluid are caused to be released as the fluid is moved downwardly within the channel-shaped slide and into the reservoir.

21. The method as claimed in claim 20 wherein the angular orientation of the slide is established by the viscosity of the fluid and it is within the range of 20°–30°.

22. The method as claimed in claim 20 further comprising the step Of detecting the level condition of the fluid volume within the chamber and either increasing or decreasing the amount of fluid being fed into the chamber such that the fluid level moves upwardly and downwardly in accordance with the level condition between two level positions within the chamber.

23. A method of degassing a viscous fluid comprising the steps of:

(a) drawing a vacuum within a chamber;

(b) dispensing the viscous fluid within the chamber through a wide-slotted nozzle opening to spread the fluid such as to cause at least some entrapped gas bubbles to burst;

(c) causing the dispensed fluid to flow downwardly across a defined inclined longitudinal channel comprising a bottom slide surface and a pair of longitudinally extending side walls to effect laminar flow as it moves to a collection reservoir within the chamber;

(d) holding the fluid within the collection reservoir for a sufficient length of time such that any entrapped gas bubbles are drawn off; and (e) removing fluid material from the collection reservoir and the chamber.

24. The method as claimed in claim 23 further comprising the step of varying the volume of fluid dispensed within the chamber such as to also vary the level of fluid contained within the collection reservoir.

25. An apparatus for degassing viscous fluids comprising:

a chamber having an inlet at a top end for receiving a source of a viscous fluid under pressure;

a means connected to the chamber for drawing and controlling a vacuum within the chamber;

a wide-slotted nozzle means, coupled to the inlet, for dispensing and spreading the fluid such that at least some entrapped gaseous bubbles burst;

a channel means comprising a bottom slide surface and a pair of longitudinally extending side walls, receiving the dispensed fluid, for directing the fluid downwardly across an inclined defined channel surface which effects laminar flow thereof;

a collection reservoir for collecting the laminar flow of fluid;

a means for varying the rate at which fluid is dispensed within the chamber for varying the fluid level within the collection reservoir; and an outlet means for removing the fluid from the collection reservoir.

26. An apparatus for degassing a high viscosity fluid comprising:

a vacuum chamber including a longitudinal vertical axis, a fluid inlet port at its top end and, a fluid collecting reservoir and exit port at its bottom end;

a wide-slotted nozzle mounted within the vacuum chamber in a position at the top end to accept fluid and move it out of its exit port;

a channel-shaped longitudinal slide comprising a bottom slide surface and a pair of longitudinally extending side walls positioned within the vacuum chamber at an angular orientation with reference to the chamber vertical axis and in relative position at its top end to the nozzle exit port and at its bottom end to the fluid collecting reservoir for producing laminar fluid flow; and a means for applying a vacuum to the chamber as fluid is fed into the chamber such that gaseous bubbles contained within the fluid are caused to be released as the fluid is moved downwardly within the channel-shaped slide and into the reservoir.

27. The apparatus of claim 26 wherein the angular orientation of the slide is established by the viscosity of the fluid and it is within the range of 20°–30°.

28. The apparatus of claim 26 further comprising a means for detecting a level condition of the fluid volume within the chamber and either increasing or decreasing the amount of fluid being fed into the chamber such that the fluid level moves upwardly and downwardly in accordance with the level condition between two level positions within the chamber.

* * * * *